Patented Sept. 1, 1925.

1,551,849

UNITED STATES PATENT OFFICE.

KARL SCHIRMACHER AND WILHELM ECKERT, OF HOCHST-ON-THE-MAIN, GERMANY, ASSIGNORS TO FARBWERKE VORM. MEISTER LUCIUS & BRÜNING, OF HOCHST-ON-THE-MAIN, GERMANY, A CORPORATION OF GERMANY.

PROCESS OF PRODUCING VAT DYESTUFFS OF THE PERYLENE SERIES AND THE PRODUCTS OBTAINABLE THEREBY.

No Drawing. Application filed April 27, 1925. Serial No. 26,283.

*To all whom it may concern:*

Be it known that we, KARL SCHIRMACHER and WILHELM ECKERT, citizens of Germany, residing at Hochst-on-the-Main, Germany, have invented certain new and useful Improvements in the Process of Producing Vat Dyestuffs of the Perylene Series and the Products Obtainable Thereby, of which the following is a specification.

We have found that new valuable vat-dyestuffs of the perylene series are obtained by treating in the heat the oxidation products of vat-dyestuffs having perylene structure with acid condensing agents, such as for instance aluminium chloride, zinc chloride etc. and by alkylating the thus formed new reaction products. The chemical constitution of these new dyestuffs is unknown hitherto; they are distinguished by pure beautiful tints and very good fastness properties.

The following examples illustrate our invention:

1. 10 parts of the oxidation product of dibenzathrone obtainable according to Example 2 of United States Patent No. 1,093,427 are heated while stirring with 50 parts of zinc chloride free from water to 310-320° C. After termination of the reaction the cold fusion is made into pieces, boiled up with water, then separated and washed. The paste still in a moist state is then heated with 300 parts of nitrobenzene, 15 parts of soda and 15 parts of p-toluene-sulfonic-acid-methylester to 165-170° C. until the deep-blue coloration of the solution no longer increases which is the case after about 2 hours. The solution is filtered by suction while hot. The reaction product separates on cooling in blue violet crystals which possess an intense metallic lustre when in a dry state and dissolve in concentrated sulfuric acid with a claret-red hue.

The new dyestuff dyes from the violet vat cotton violet tints; when exposed to the air a clear blue is obtained.

2. If instead of the oxidation product of dibenzanthrone used according to Example 1, the oxidation product of dimethyldibenzanthrone is employed and the operations carried out as stated in Example 1, a dyestuff is obtained possessing similar properties as those indicated in Example 1. The dimethylbenzanthrone can be prepared by fusing with caustic potash at 220-225° C. the 7-methyl-1.9-benzanthrone of the melting point 158-159° C. obtained by Scholl by condensing para-toluic acid chloride with naphthalene and subsequently closing the ring by heating with aluminium chloride (see Annalen 394, page 148).

3. 10 parts of the oxidation product of dibenzanthrone, obtainable according to Example 2 of United States Patent No. 1,093,-427 are heated to 310-320° C. with 100 parts of aluminium chloride, while stirring. The product of the reaction is boiled up with diluted hydrochloric acid, filtered by suction, washed until neutral and dried. The product is then heated to slight boiling for 3 hours with 25 parts of calcined soda and 25 parts of p-toluenesulfonic-acid-ethylester in 350 parts of nitrobenzene.

The further operations are carried out as indicated in Example 1. The dyestuffs thus obtained forms a bluish-violet vat dyeing cotton also a bluish-violet tint, which when exposed to the air, changes to a clear steel-blue.

Instead of nitrobenzene there may be used other solvents of high boiling point, such as trichlorobenzene etc. Instead of para-toluenesulfonic-acid-alkylester there may also be used with the same result other alkylating agents such as for instance dialkylsulfate.

We claim:

1. Process of producing vat-dyestuffs which consists in treating the oxidation products of vat-dyestuffs containing a perylene nucleus with metallic chlorides capable of acting as dehydrating or condensing agents in the heat and alkylating the obtained products.

2. Process of producing vat-dyestuffs which consists in treating the oxidation products of vat-dyestuffs containing a perylene nucleus with metallic chlorides capable of acting as dehydrating or condensing agents in the heat and methylating the obtained producte.

3. Process of producing new vat-dyestuffs which consists in treating an oxidation product of a dibenzanthrone with a metallic chloride capable of acting as a dehydrating or condensing agent and alkylating the obtained product.

4. Process of producing vat-dyestuffs which consists in treating an oxidation product of a dibenzanthrone with a metallic chloride capable of acting as a dehydrating or condensing agent in the heat and methylating the obtained product.

5. As new products, the vat-dyestuffs, substantially identical with the products obtainable by treating the oxidation products of vat-dyestuffs containing a perylene nucleus with metallic chlorides capable of acting as dehydrating or condensing agents in the heat and alkylating the obtained products.

6. As new products, the vat-dyestuffs, substantially identical with the products obtainable by treating the oxidation product of a dibenzanthrone with metallic chlorides capable of acting as dehydrating or condensing agents and alkylating the obtained products, being violet powders, soluble in concentrated sulfuric acid with a violet to red color, difficulty soluble in solvents of a high boiling point, forming a vat of a bluish-violet color from which cotton is dyed blue tints.

7. As new products, mono-alkyloxydibenzanthrones, substantially identical with the dyestuffs obtainable by treating the oxidation products of a dibenzanthrone with metallic chlorides capable of acting as dehydrating or condensing agents and treating the obtained products with an alkylating agent, being violet powders, soluble in concentrated sulfuric acid with a claret-red color, difficultly soluble in solvents of a high boiling point, forming a vat of a bluish-violet color from which cotton is dyed blue tints.

8. As a new product, a monomethoxydibenzanthrone, substantially identical with the dyestuff obtainable by treating the oxidation product of a dibenzanthrone with metallic chlorides capable of acting as dehydrating or condensing agents and methylating the obtained product, being soluble in concentrated sulfuric acid with a claret-red color, forming a bluish-violet vat from which cotton is dyed steel-blue tints.

In testimony whereof, we affix our signatures.

KARL SCHIRMACHER.
WILHELM ECKERT.